United States Patent [19]

Asano

[11] 4,008,356
[45] Feb. 15, 1977

[54] CELL RETAINING CASING FOR PHOTOGRAPHIC CAMERAS

[75] Inventor: Seizi Asano, Okegawa, Japan

[73] Assignee: Fuji Photo Optical Co., Ltd., Omiya, Japan

[22] Filed: Oct. 22, 1975

[21] Appl. No.: 624,599

[30] Foreign Application Priority Data

Nov. 1, 1974  Japan ............... 49-132815[U]

[52] U.S. Cl. .............................. 429/98; 206/333; 339/95 R; 354/202
[51] Int. Cl.² .................................. H01M 2/10
[58] Field of Search ............. 320/2; 58/23 BA; 136/167, 173, 174, 110, 181; 206/333; 354/202, 288, 354; 339/95 R; 429/96–100

[56] References Cited

UNITED STATES PATENTS

| | | |
|---|---|---|
| 3,535,996 | 10/1970 | Winkler et al. .............. 136/173 X |
| 3,542,603 | 11/1970 | Simon ............... 136/173 |
| 3,587,423 | 6/1971 | Simon ............... 354/148 |
| 3,753,389 | 8/1973 | Monks ............... 354/354 |

Primary Examiner—Joseph W. Hartary

[57] ABSTRACT

A casing for retaining therein a series of dry cells is provided with cell holding members which hold the cells allowing movement in one direction of the cells, and a member for moving the cells in said direction. The direction in which the cells are made movable is lateral to the direction of connection of the cells connected in series in a line in the casing so that the electrodes of the cells connected with the electrodes adjacent thereto are abraded when the cells are moved in said direction by the movable member. The movable member may be a cover of the housing of the casing or other member associated with the shutter release mechanism or the like.

8 Claims, 4 Drawing Figures

CELL RETAINING CASING FOR PHOTOGRAPHIC CAMERAS

BACKGROUND OF THE INVENTION

1. Field of the Invention

This invention relates to a casing for retaining therein a series of dry cells provided in a photographic camera or the like, and more particularly to a casing with a cleaning device for retaining a series of dry cells connected in series wherein the surfaces of the electrodes of the cells are cleaned while the cells are in the casing.

2. Description of the Prior Art

In photographic cameras, transistor radios, portable tape recorders and the like, dry cells are usually connected with each other in a casing and sandwiched between a pair of oppositely disposed elastic electrodes.

The above described type of casing has the defect that the surfaces of the electrodes of the cells and the surfaces of the oppositely disposed electrodes are liable to be corroded and electric connection between electrodes is apt to be lowered or broken off. Therefore, it has been required to clean the surface of the electrodes by use of abrasives to maintain stable and sufficient electric connection between adjacent electrodes.

SUMMARY OF THE INVENTION

In view of the defects inherent in the conventional dry cell casing in a photographic camera or the like, it is the primary object of the present invention to provide a casing for retaining therein a series of dry cells having a cleaning means to clean the surfaces of the electrodes of the cells and the electrodes oppositely disposed in the casing to sandwich the cells therebetween.

Another object of the present invention is to provide a casing for retaining therein a series of dry cells wherein the cells are made movable transversely while they are retained therein to clean the surfaces of the electrodes thereof.

The dry cell casing for cameras in accordance with the present invention comprises a dry cell holding means provided in a cell casing body for holding the cells in such a state that the cells are connected in series and movable transversely, and means provided in the casing body for moving the cells transversely. By moving one cell transversely with respect to another connected adjacent thereto, the surfaces of the electrodes are abraded and cleaned to maintain stable electric connection.

DESCRIPTION OF THE PREFERRED EMBODIMENTS

Figure 1:
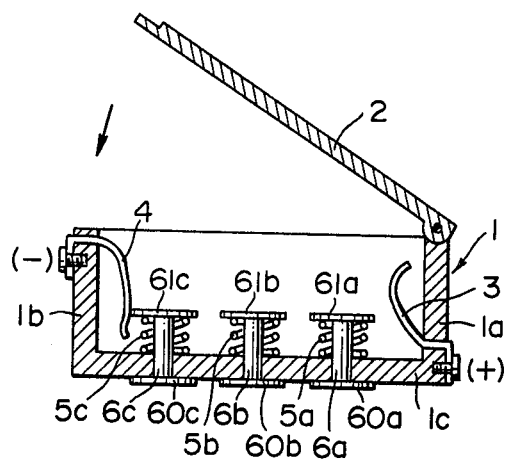
FIG. 1 is a longitudinal sectional view showing one embodiment of the casing in accordance with the present invention.
Figure 2:
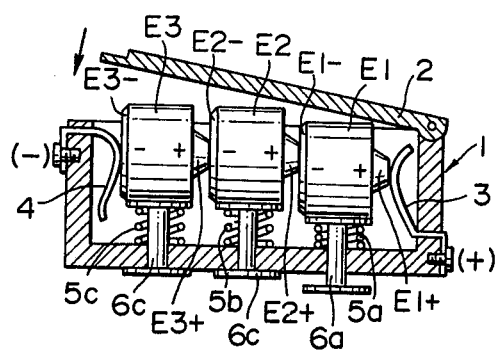
FIG. 2 is a longitudinal sectional view showing the embodiment as shown in FIG. 1 wherein dry cells are retained therein with the cover of the casing half opened.

One embodiment of the present invention is illustrated in FIGS. 1 and 2 in longitudinal cross section. The casing in accordance with the present invention is comprised of a dry cell retaining housing 1, a cover 2 hinged at an end thereof, to an end of said cell retaining housing 1, a pair of oppositely disposed elastic electrode springs 3 and 4 each fixed at an end thereof to one of the end walls 1a and 1b of the housing 1, and three cell holding members 6a, 6b and 6c provided on the bottom 1c of the housing and inwardly spring-biased by means of compression springs 5a, 5b and 5c. The three cell holding members 6a–6c are arranged in a line along the cell retaining housing 1 and have end plates 60a and 61a, 60b and 61b, 60c and 61c, respectively, at the opposite ends thereof to fix the position thereof in the housing 1 in combination with the compression springs 5a–5c. That is, the spring 5a is interposed between the inner end plate 61a and the bottom 1a of the housing to urge the holding member 6a inward. The outer end plate 60a limits the inward movement of the holding member 6a as shown in FIG. 1. One of the electrode springs 3 is an electric contact to be in contact with the anode of the cell retained in the housing 1, and the other of the electrode springs 4 is an electric contact to be in contact with the cathode of the cell. In the embodiment shown in FIGS. 1 and 2, three cell holding members 6a, 6b and 6c are provided for holding three dry cells E1, E2 and E3 as shown in FIG. 2.

When the dry cells E1–E3 are put into the housing 1, the top of the cells are slightly projected upward from the housing 1 as shown in FIG. 2. As the cover 2 is closed as shown in FIG. 2, the top of the cells E1–E3 is pushed inward thereby. Since the cell E1 located nearest the hinged end of the cover 2 is pushed inward first when the second cell E2 is still in the uppermost position, the surface of the electrodes E1+ and E1− of the first cell E1 are slid with respect to the anode electrode spring 3 and the anode E2+ of the second cell E2. Then, when the second cell E2 is pushed down by further closing the cover 2, the anode E2+ of the second cell E2 is slid with respect to the cathode E1− of the first cell E1 which is in the pushed down position and the cathode E2− of the second cell E2 is slid along the anode E3+ of the third cell E3 which is in the upper position. Similarly, by further closing the cover 2, the anode E3+ and cathode E3− of the third cell E3 are slid along the cathode E2− of the second cell E2 and the cathode electrode spring 4, respectively. In greater detail, the electrodes of the other cells E1 and E2 are also slid with respect to the adjacent electrodes when the cover 2 is further closed since the other cells E1 and E2 are still in the process of being pushed down to the bottom position when the third cell E3 is pushed down from the uppermost position to the bottom position.

Thus, the surfaces of the electrodes of the cells E1–E3 are abraded when the cover 2 is closed. Quite similarly, when the cover 2 is opened, the cells E1–E3 are slid with respect to each other being pushed upward by the expanding compression springs 5a–5c and surfaces of the electrodes are abraded by the friction between adjacent electrodes. Thus, the surface of the electrodes is cleaned by simply closing and opening the cover 2 of the housing 1.

Figure 3:
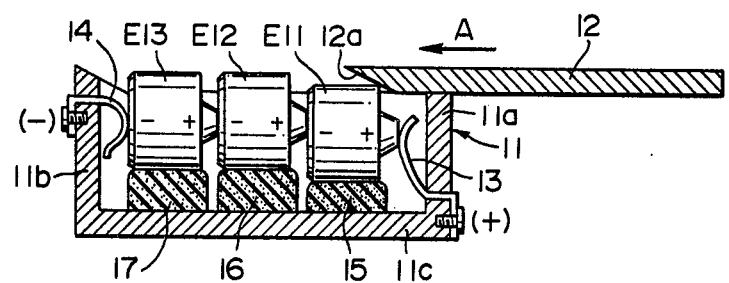
FIG. 3 is a longitudinal sectional view showing another embodiment of the casing in accordance with the present invention.

A second embodiment of the present invention wherein the springs and holding members are replaced by elastic materials such as rubber is illustrated in FIG. 3. In this embodiment, a cell retaining housing 11 is provided with a slide cover 12 which is slidable in the direction as indicated by the reference character A along the upper end of the housing 11 to close and open the housing 11. The slide cover 12 has a slant end 12a which faces obliquely downward as shown in FIG. 3. The housing 11 is provided with a pair of oppositely disposed electrode springs 13 and 14 on the end plates 11a and 11b thereof. The housing 11 is further provided on the bottom 11c thereof with elastic cell holding members 15, 16 and 17 made of elastic material such as rubber. Dry cells E11, E12 and E13 are put on the elastic holding members 15, 16 and 17, respectively, with the top thereof slightly projected out of the housing 11 as shown in FIG. 3 at the second and third cells E12 and E13. When the cover 12 is closed, the slant end 12a of the cover 12 pushes the tops of the cells inward as shown in FIG. 3 at the first cell E11.

When the cells E11–E13 are put into the housing 11, the electrodes thereof are in contact with the adjacent electrodes since the cells E11–E13 are positioned in series contact with each other being sandwiched between the oppositely disposed electrode springs 13 and 14. Therefore, when the slide cover 12 is closed and the cells E11–E13 are pushed down one by one, each electrodes thereof is slid with respect to the adjacent electrode in contact therewith and is abraded as in the first embodiment shown in FIGS. 1 and 2. Thus, the electrodes are cleaned by simply closing the slide cover 12. Similarly, when the cover 12 is opened, each electrode is slid with respect to the adjacent electrode as the cells E11–E13 are pushed upward by the elastic holding members 15–17 accompanying the opening of the cover 12. Therefore, the electrodes are cleaned by simply closing and opening the slide cover 12.

Figure 4:
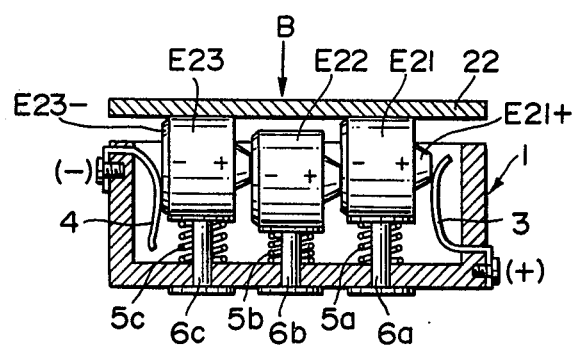
FIG. 4 is a longitudinal sectional view showing still another embodiment of the casing in accordance with the present invention.

Still another embodiment of the present invention is illustrated in FIG. 4, wherein the cell holding members and the compression springs as employed in the first embodiment are used. In this embodiment, one of the holding members has a height different from that of the other holding members and the cover is not hinged to the housing. Referring to FIG. 4 wherein those elements that are identical with the elements employed in the first embodiment shown in FIGS. 1 and 2 are designated with the same reference numerals as those used in FIGS. 1 and 2, the central cell holding member 6b' among the three members provided in the housing 1 is shorter than the other holding members 6a and 6c. The cover 22 is movable in the direction as indicated by the reference character B which is the same as the direction in which the holding members 6a, 6b' and 6c are movable. When the cover 22 is closed, the cells E21 and E23 put on the higher holding members 6a and 6c are first pushed down and then the cell E22 between the other two cells E21 and E23 is pushed down. Therefore, at the initial stage of the closure of the cover 22, the electrodes of the central cell E22 remain stationary while the adjacent electrodes in contact therewith are slid with respect thereto. At the second stage of the closure of the cover 22, the three cells E21–E23 are pushed down together and the anode E21+ of the first cell E21 and the cathode E23– of the third cell E23 are slid with respect to the anode electrode spring 3 and the cathode electrode spring 4, respectively. Thus, in the third embodiment of the invention, the electrodes of the cells are abraded by the closure of the cover. The electrodes are also abraded and cleaned when the cover is opened.

It will be understood by those skilled in the art that the cover for pushing down the cells in the above embodiments may be replaced by a member which is moved in association with a shutter release operation or film winding operation of a camera. In the case that the member which is moved in association with the shutter release or other camera operation is substituted for the cover in the above embodiments, incomplete contact at the electrodes is effectively prevented by the cleaning operation which is automatically repeated each time the associated operation of the camera is performed. It will further be noted by those skilled in the art that the cell holding members may be of different structure. For instance, when the casing is provided with a movable member to transversely move cells with respect to each other while the cover is closed, it is not necessary for the cell holding members to hold the cells with the top portion thereof projected out of the housing.

For example, it is possible to provide a movable member as the cover 22 employed in the third embodiment on the side of a housing and to provide cell holding members as those employed in the third embodiment on the side wall of the housing opposite to the movable member so that the cells may be moved in the direction perpendicular to the direction in which the cells are moved when they are put into the housing.

I claim:
1. A casing for retaining therein a series of dry cells for a photographic camera or the like comprising:
    a housing for retaining therein a series of dry cells connected in series in a line,
    a pair of oppositely disposed electrode springs provided on the opposite ends of the housing to sandwich the series of dry cells therebetween so that the series of dry cells arranged in a line are in pressure contact with each other,
    means for holding dry cells in the housing allowing the dry cells to transversely move independently of each other and urging said cells in one transverse direction, and
    means for moving said dry cells in the direction opposite to said transverse direction in which the cells are urged.
2. A casing for retaining therein a series of dry cells as claimed in claim 1 wherein said dry cell holding means comprises a plurality of movable members to support said dry cells and spring means for urging the movable members in said transverse direction.
3. A casing for retaining therein a series of dry cells as claimed in claim 2 wherein said movable member for one cell has a different size from that of the movable member for another cell.
4. A casing for retaining therein a series of dry cells as claimed in claim 1 wherein said dry cell holding means comprises an elastic member elastically supporting the cell to allow the transverse movement thereof.
5. A casing for retaining therein a series of dry cells as claimed in claim 1 wherein said dry cell moving means is a cover movable to close and open the housing and said dry cell holding means holds the cells with the top portion thereof projected out of the housing so that the cells are pushed inward and moved transversely by the closure of the cover.

6. A casing for retaining therein a series of dry cells as claimed in claim 5 wherein said cover is a rigid cover hinged at an end thereof to an end of the housing.

7. A casing for retaining therein a series of dry cells as claimed in claim 5 wherein said cover is a rigid slidable cover having a slant end facing obliquely inward which is slidable on the housing to close and open the housing.

8. A casing for retaining therein a series of dry cells as claimed in claim 5 wherein said cover is a rigid cover movable in the direction parallel to said direction in which the cells are moved by said moving means to close and open the housing.

* * * * *